United States Patent [19]

Cordell, Jr.

[11] 4,057,926
[45] Nov. 15, 1977

[54] FISHING ROD

[76] Inventor: Carl R. Cordell, Jr., P.O. Box 2020, Hot Springs, Ark. 71901

[21] Appl. No.: 708,199

[22] Filed: July 23, 1976

[51] Int. Cl.² ............................................. A01K 87/00
[52] U.S. Cl. .................................................. 43/18 GF
[58] Field of Search .................... 43/18 R, 18 GF, 24, 43/25; 273/80.2, 80.3, 68, 80 R, 80 B, 80 D

[56] References Cited

U.S. PATENT DOCUMENTS

| 164,828 | 6/1875 | Graves | 43/18 R |
| 931,277 | 8/1909 | Crane | 43/18 R |
| 2,536,388 | 1/1951 | Murray | 43/18 R |
| 3,445,952 | 5/1969 | Ferman | 43/18 GF |
| 3,613,287 | 10/1971 | Grein | 43/18 GF |

Primary Examiner—Warner H. Camp
Attorney, Agent, or Firm—Berman, Aisenberg & Platt

[57] ABSTRACT

A strengthened fiberglass fishing rod includes a hollow, tubular butt section and a solid tip section, both sections being tapered longitudinally with the base of the tip section inserted in and cemented to the butt section. To conceal the joint between the two sections and greatly enhance the appearance of the rod, the frame of a guide for the fishing line is laid across the joint and fastened by a wrapping of thread which extends over contiguous end portions of the tip and butt rod sections. If desired, the wrapping over the rod section joint may be utilized alone without the fishing line guide. The invention also contemplates the method of making the described rod.

4 Claims, 4 Drawing Figures

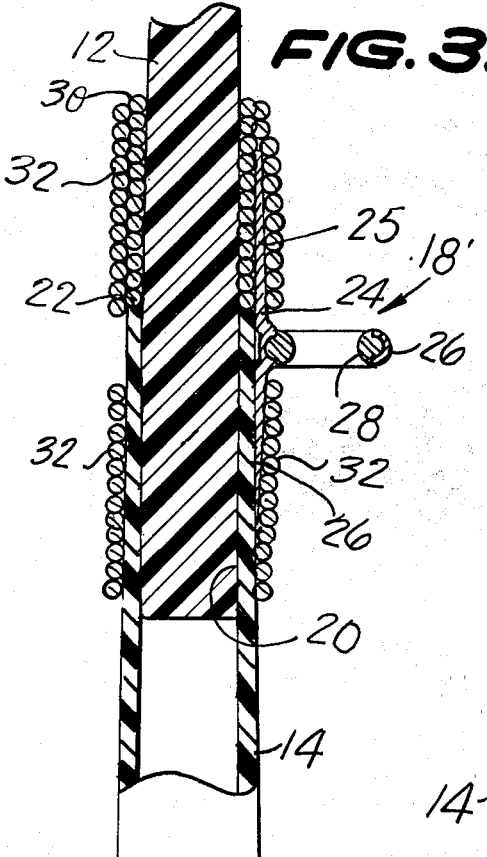
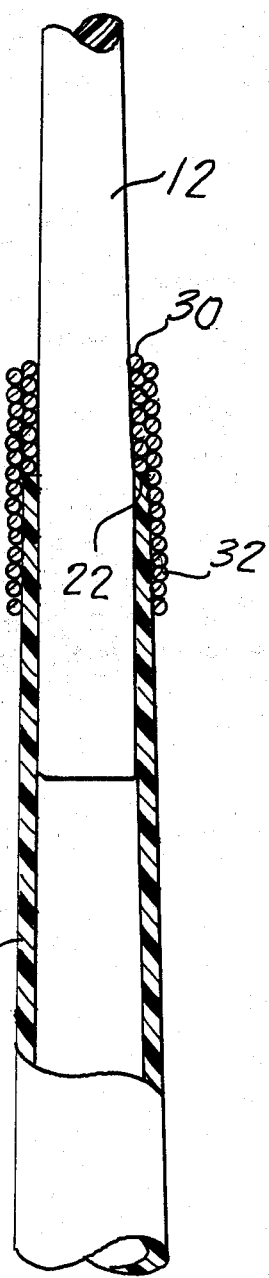

FISHING ROD

BACKGROUND OF THE INVENTION

1. Field of the Invention

The invention relates to fishing rods and more particularly to a strengthened rod made of fiberglass in which the tip section is solid and permanently connected to a hollow butt section in such manner that the joint between the sections is concealed.

2. Description of the Prior Art

Most conventional fishing rods presently are made of hollow fiberglass tubes for light weight but adequate resilience, fiberglass having replaced split bamboo which tends to warp and take a set. Solid fiberglass rods have also been used but these are generally too heavy to achieve universal acceptance. One of the defects of hollow rods is that the reduced diameter of the tip section and its very thin wall under strong forces engendered during reeling in of larger, more powerful fish, frequently causes the rod to break at or near the tip.

Many modern rods are formed in two, or more, telescoping sections for convenient separation and transportation, or storage, while not in fishing use. A serious defect of these rods is the unsightliness of the rod joints which has resulted in poor consumer acceptance. In addition, the telescoping joints are usually reinforced by male and female ferrules which must be fitted to the rod sections and which thus materially add to the cost of making the rod. As alternatives to the connecting ferrules, sleeves or solid inserts are placed about or within the rod joints. These also add to the cost of the rod.

SUMMARY OF THE INVENTION

It is a primary object of the invention to provide a strengthened fishing rod employing a solid fiberglass tip section and a hollow, tubular butt section which will overcome the defects and disadvantages of conventional rods as briefly outlined above.

It is a further important object of the invention to provide a partly solid, partly hollow fiberglass rod which is shaped and sized to increase the rod strength without deleteriously affecting the weight, balance, mode of action, positioning of the node and other characteristics of conventional hollow rods.

Another important object of the invention is to provide a partly solid, partly hollow fiberglass rod in which the joint between the solid and hollow sections is concealed so that the rod appears to be conventional and is aesthetically pleasing.

A still further object of the invention is to provide a partly solid, partly hollow fiberglass rod in which the solid and hollow sections are fitted together without special ferrules, sleeves or inserts, thus reducing the cost of fabrication and the expense to the purchaser as compared to telescoping rods of conventional types.

Upon the introduction of a fishing rod made according to this invention, commercial acceptance was immediate and there was a significant increase in sales as compared to the sale of rods made theretofore.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is an elevational view of the outer portion of a fishing rod constructed in accordance with the invention;

FIG. 2 is an enlarged sectional view taken along line 2—2 of FIG. 1 and looking in the direction of the arrows;

FIG. 3 is a sectional view taken along line 3—3 of FIG. 2 and looking in the direction of the arrows; and FIG. 4 is a sectional view similar to FIG. 3 but showing another embodiment of the invention.

DESCRIPTION OF THE PREFERRED EMBODIMENT

Referring now more particularly to the drawings, in FIG. 1 is illustrated the outer portion of a fishing rod generally indicated by the reference numeral 10, which is constructed in accordance with the invention and which includes a tip section 12, a butt section 14, a tip guide 16, and a plurality of spaced fishing line guides 18, 18' and 18".

The tip section of the rod is formed of solid fiberglass as best seen in FIGS. 2 and 3, and is tapered longitudinally so as to present the larger diameter at the base and the smaller diameter at the outer end or tip. An inch or two of the base portion is sized to exactly conform in diameter and taper with the abutting inner face of the hollow butt section 14, which is also longitudinally tapered in the manner of conventional, hollow fiberglass rods.

In assembling the tip and butt sections 12 and 14, the closely fitting and exactly sized base portion of the tip section is inserted an inch or two into the mouth of the hollow butt section 14 and is preferably permanently affixed thereto by a thin layer of glue or cement 20. Thus, the joint of the tip and butt sections is defined by an unsightly shoulder 22 formed by the wall thickness of the butt section 14. This unsightliness is overcome by attachment and fastening of the line guide 18', as will be described hereinafter. The line guides may have any conventional construction including a support frame and a ring for passage of the line. For illustration, guide 18' includes a narrow elongated frame 24 integrally formed with, and integrally secured to, an upstanding ring 26 at approximately its center. Within the ring is glued a second ring 28 of antifriction plastic material. The frame 24 has oppositely extending legs 25, 26 and is longitudinally linear in shape so that its left side as viewed in FIG. 3 may be laid against the outer surface of the butt section 14 in a longitudinal direction. The legs 25, 26 are curved transversely along their entire length to fit the curvature of the outer surface of the butt section 14, even though the latter is tapered slightly. Thus, in assembling the fishing rod, it is possible and desirable to closely wind a first spiral filament layer 30 about the tip section 12 starting at the butt section shoulder 22. The legs 25, 26 of guide 18' are then laid longitudinally along the rod with leg 26 abutting the butt section 14 and leg 25 abutting the layer 30, which layer in effect prolongs the wall of the butt section. The filament is then tightly wrapped in a second layer 32 in the opposite direction to cover both of the legs 25, 26 of the frame 24, as clearly illustrated in FIG. 3. The wrapping layers 30 and 32 serve to fasten the guide 18' firmly in place and its permanence is enhanced by applying several coatings of lacquer and a cover coating of varnish in a conventional manner. These coatings are not illustrated in the drawings. The wrapping filament or thread may be of nylon or other strong conventional material normally used for fastening guides to fishing rods. While only two layers have been shown and described, the wrapping may constitute more layers if desired and, particularly, an extra layer may be placed on butt section 14 between this section and the frame 24 to further cushion the guide.

As described above, both the structure and mode of assembling or fabricating the improved fishing rod have been covered. It need be further stated only that the dimensions including length, taper and diameter of the tip section 12, as well as the corresponding dimensions and the wall thickness of the butt section 14 are selected in the design of the rod to provide the proper location of the node of the rod and the type of action desired in its use, as to characteristics such as whip and slowness or speed.

The use of a solid tip section 12 greatly strengthens the rod and prevents breakage of the tip under severe stresses as normally occurs with conventional rods. As described, it will be seen that the placement of the guide 18' and the wrapping layers 30 and 32 over the joint between the solid and hollow rod portions serves to conceal the joint and render the rod indistinguishable from conventional one piece hollow rods.

The modified embodiment of the invention illustrated in FIG. 4 is, in all structural respects, identical with the embodiment illustrated in FIGS. 1 – 3, except that the guide 18' covering the joint between the rod sections 12 and 14 is omitted at this particular location. Instead, the wrapping layers 30 and 32 are wound about the rod at the joint marked by shoulder 22 just as if a guide and its frame 24 were located in this position. The wrapping layers 30 and 32, therefore, serve in the same manner to conceal the joint and enhance the appearance of the rod, without revealing that the rod is partially solid and partially hollow.

Although certain specific embodiments of the invention have been shown and described, it is obvious that many modifications thereof are possible. The invention, therefore, is not intended to be restricted to the exact showing of the drawings and the description thereof, but is considered to include reasonable and obvious equivalents.

What is claimed is:

1. A fishing rod comprising a longitudinally tapered, hollow, unreinforced, tubular butt section and a solid rod-like, longitudinally tapered tip section, both sections being formed of fiberglass, a portion of the tip section being inserted in the outer end of the butt section, and a continuous filament wrapping engaging continuous parts of the tip and butt sections so as to conceal the joint of the said two sections.

2. A fishing rod according to claim 1, wherein a guide for the fishing line having a frame is positioned over the joint of the tip and butt sections and said wrapping covers the frame of the guide, said frame having oppositely extending legs arranged longitudinally of said sections and each leg being positioned respectively against the adjacent end of one of said sections, said wrapping comprising a first layer positioned between one leg of said frame and the adjacent rod section and a second layer positioned over both of said legs so as to provide a substantially smooth and unbroken look to said wrapping.

3. A fishing rod according to claim 2, wherein the part of the solid tip section which is inserted in the hollow butt rod section is permanently secured thereto by a cementicious material.

4. The method of making a fishing rod which comprises the steps of:
 a. forming a hollow, longitudinally tapered, tubular butt section of fiberglass without internal reinforcement,
 b. forming a solid rod-like, longitudinally tapered tip section of fiberglass,
 c. inserting the solid tip section partly within the outer end of the butt section,
 d. positioning a guide for a fishing line having a frame over the joint of the tip and butt sections, said frame having oppositely extending legs arranged longitudinally of said sections and each leg being positioned respectively over and against an end of one of said sections, and
 e. concealing the connecting joint between said tip and butt sections and securing said guide by wrapping a filament over said joint and the frame of the guide, said wrapping being formed by a first layer wound directly on the solid tip section and a second layer wound to cover the guide frame and the end portions of both the tip and butt rod sections, said first layer being positioned between one leg of said frame and the adjacent rod section and said second layer being positioned over both of said legs so as to provide a substantially smooth and unbroken look to said wrapping.

* * * * *

UNITED STATES PATENT AND TRADEMARK OFFICE
CERTIFICATE OF CORRECTION

PATENT NO. : 4,057,926

DATED : November 15, 1977

INVENTOR(S) : Carl R. Cordell, Jr.

It is certified that error appears in the above-identified patent and that said Letters Patent are hereby corrected as shown below:

Column 4, line 5, "tinuous" should read --tiguous--; line 40, "fr ame" should read --frame--.

Signed and Sealed this

Eleventh Day of April 1978

[SEAL]

Attest:

RUTH C. MASON
Attesting Officer

LUTRELLE F. PARKER
Acting Commissioner of Patents and Trademarks